United States Patent [19]

Björkman

[11] Patent Number: 5,040,892
[45] Date of Patent: Aug. 20, 1991

[54] METHOD AND APPARATUS FOR DETERMINING THE DIRECTION TO A LASER BEAM SOURCE

[75] Inventor: Bengt Björkman, Järfälla, Sweden

[73] Assignee: Bofors Electronics AB, Jarfalla, Sweden

[21] Appl. No.: 515,125

[22] Filed: Apr. 27, 1990

[30] Foreign Application Priority Data

Apr. 28, 1989 [SE] Sweden .............................. 8901555

[51] Int. Cl.$^5$ .............................................. G01C 1/00
[52] U.S. Cl. .................................. 356/141; 250/203.3
[58] Field of Search ............................. 356/141, 152; 250/203.1, 203.3, 203.4, 203.6

[56] References Cited

U.S. PATENT DOCUMENTS

| | | | |
|---|---|---|---|
| 3,989,942 | 11/1976 | Waddoups | 356/152 X |
| 4,674,874 | 6/1987 | Halldorsson et al. | 356/152 |
| 4,687,923 | 8/1987 | Bauck | 126/425 X |
| 4,855,588 | 8/1989 | Holmes | 356/141 X |
| 4,867,556 | 9/1989 | Björkman | 356/152 X |

FOREIGN PATENT DOCUMENTS

| | | |
|---|---|---|
| 269142 | 1/1988 | European Pat. Off. . |
| 455025 | 6/1988 | Sweden . |
| 2123949 | 2/1984 | United Kingdom . |

Primary Examiner—Linda J. Wallace
Attorney, Agent, or Firm—Pollock, Vande Sande & Priddy

[57] ABSTRACT

Method and apparatus for determining the direction to a laser beam source includes detecting amplitude peaks in the light occurring when a pulsed laser beam generated by the laser beam source passes through an air space. The detection is carried out with at least one rotating receiver lobe which images the scattered light on an associated fixed detector. The detected amplitude peaks are compared in order to determine the greatest amplitude peak. The angle of rotation value of the receiver lobe, when the greatest amplitude peak is detected, is determined as belonging to a limited angle range within which the direction to the laser beam source is assumed to lie. The apparatus comprises a rotatable optics system, a fixed detector system which detects the magnitude of the light transmitted through the optics system to the fixed detector, and an evaluation part which compares detected amplitude peaks. The optics system comprises at least one light input with, counting from each light input, a first cylindrical lens, prism, reflector, filter, second cylindrical lens, diaphragm and glass block. By using a rotating receiver lobe instead of a plurality of fixed receiver lobes, a low-component and thus uncomplicated direction-determining apparatus is obtained.

7 Claims, 2 Drawing Sheets

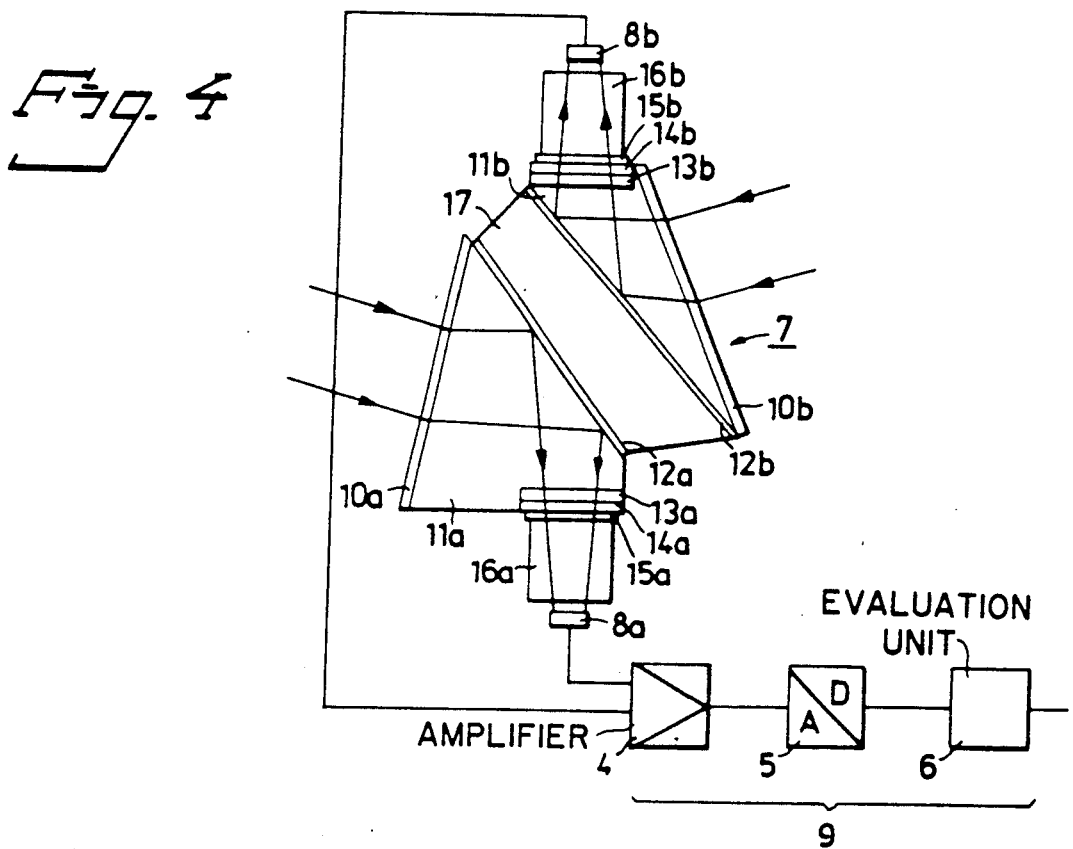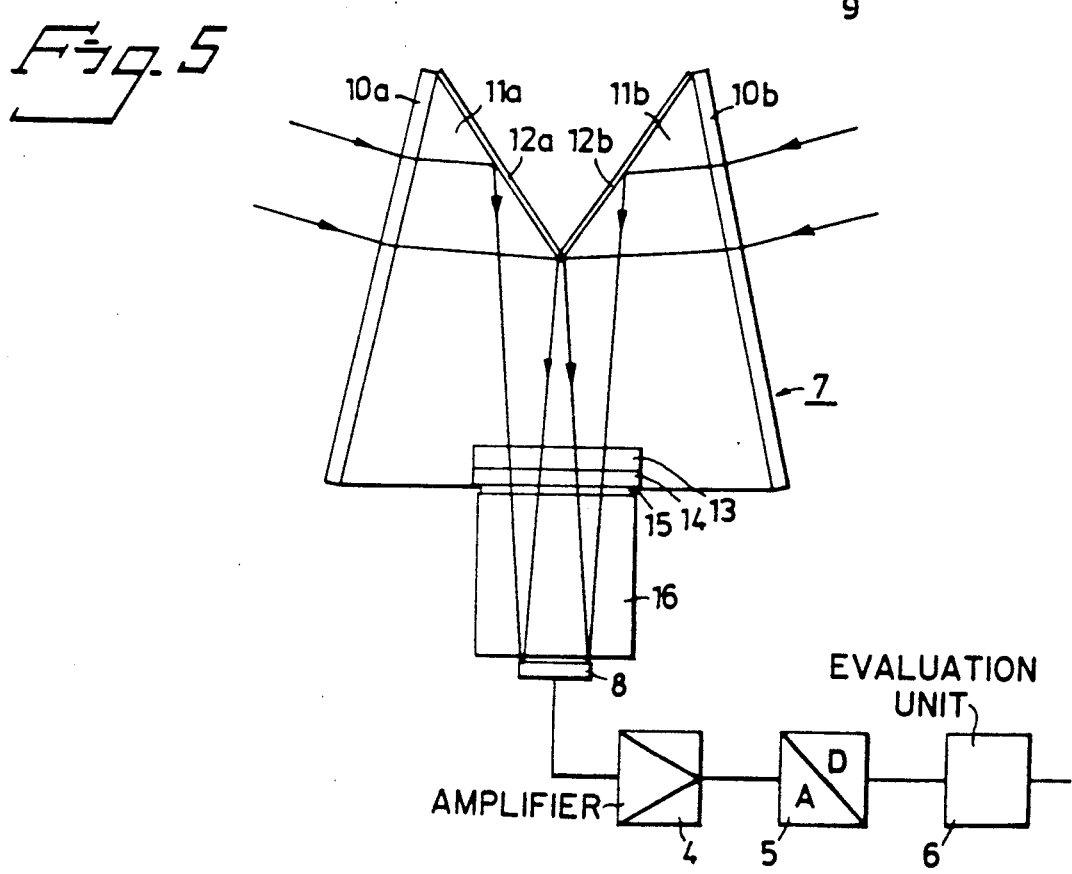

METHOD AND APPARATUS FOR DETERMINING THE DIRECTION TO A LASER BEAM SOURCE

FIELD OF THE INVENTION

The present invention relates to a method for determining the direction to a laser beam source emitting a pulsed laser beam, by detecting the light occurring within the scattering area of the laser beam when the pulsed laser beam generated by the laser beam source passes through an air space, which light has a pulsed character. The invention also relates to a system for determining the direction to a laser beam source emitting a pulsed laser beam, which system detects light occurring within the scattering area of the laser beam when the pulsed laser beam generated by the laser beam source passes through an air space, which light has a pulsed character.

BACKGROUND OF THE INVENTION

In a conventional method for determining the direction to a laser beam source, use is made of a number of fixed receiver lobes facing in different directions. Since each receiver lobe is allocated a specific direction, an evaluation circuit can, on the basis of the light signal picked up by the respective receiver lobes, establish the direction to the laser beam source. A conventional method of this type is used, among other things, in so-called laser-warning systems and is known, for example, from DE A1 3,323,828. Laser-warning systems are mounted on tanks for example, with the purpose of warning the crew that they may be exposed to a threat. The threat can consist of a missile which is directed towards its target by a laser pointer. In order to be able to accurately determine the direction to the laser beam source, a large number of fixed receiver lobes with associated optics and detectors are required. Known laser-warning systems constructed in accordance with the conventional method with fixed receiver lobes are therefore both expensive and complicated.

The light from a laser beam source can be divided into three types of radiation, namely scattered, direct and reflected radiation. It is the scattered radiation which is of greatest interest for the present invention. The scattered radiation from a laser beam source with a narrow beam has a weakly decreasing amplitude with increasing distance from the laser within the area in question (for example 0.2 km to a distance which is less than the meteorological visibility prevailing at the time), when the measurement of the amplitude is carried out along a line which is parallel to the midline of the laser beam and when the angle of the receiver lobe to the laser lobe is constant. Also as regards this radiation, when the angle is constant, the power amplitude is halved when the perpendicular distance from the midline of the laser lobe to the receiver is doubled. Finally, the power amplitude is halved when the angle is doubled within the range from about 0° to over 60°.

SUMMARY OF THE INVENTION

The purpose of the present invention is to provide a method for determining the direction to a laser beam source, which affords high reliability of directional determination and is easy to implement at low cost in the form of a reliable, low-component and therefore uncomplicated direction-determining system.

The purpose of the invention is achieved by means of a method in which the direction related amplitude peaks of the pulsed character of the light are detected by one or more fixed detectors with the aid of at least one rotating receiver lobe with a given limited lobe breadth in the plane of rotation of the lobe for each detector, the detected direction-related amplitude peaks are compared in order to determine the greatest amplitude peak, and the angle of rotation value of the associated receiver lobe, when the greatest amplitude peak is detected, is determined as belonging to a limited angle range within which the direction to the laser beam source is assumed to lie, and a system for determining the direction to a laser beam source which includes a rotatable optics system with at least one light input comprising, counting from each light input, a first cylindrical lens, prism, reflector, filter, second cylindrical lens, diaphragm and glass block, the receiver lobes of this optics system having a given limited lobe breadth in the plane of rotation of the system for the light inputs, by a fixed detector system in which amplitude peaks occurring within the receiver lobes are detected, and by an evaluation unit which, on the basis of the detected amplitude peaks together with associated angle of rotation values, determines the direction to the laser beam source.

It is thus possible, with the use of a single receiver lobe which is rotated, to determine the direction to the laser beam source by studying the amplitude peaks which occur in the detector during rotation of the receiver lobe. A limited angular range in associated with the direction of the greatest amplitude peak is assumed to include the actual direction to the laser beam source.

In accordance with an advantageous embodiment of the method according to the invention, the angle of rotation to the laser beam source is determined as the angle of rotation corresponding to the greatest amplitude peak corrected by an angle of rotation corresponding to half the distance between two adjoining amplitude peaks.

By providing the optics system with two light inputs and thus two receiver lobes, an arrangement can be obtained which permits faster determination of the direction to the laser beam source.

The invention will be described in greater detail below by means of examples and with reference to the attached drawings, in which:

BRIEF DESCRIPTION OF THE PREFERRED EMBODIMENT(S)

FIG. 1 illustrates a method for determining the direction to a laser beam source, FIG. 2 shows an example of amplitude peaks which can occur during scanning of one turn, FIG. 3 shows a side view of a first preferred embodiment of a system according to the invention for determining the direction to a laser beam source, FIG. 4 shows a side view of a second preferred embodiment of a system according to the invention for determining the direction to a laser beam source, and FIG. 5 shows a side view of a third exemplary embodiment of a system according to the invention for determining the direction to a laser beam source.

DETAILED DESCRIPTION OF THE DRAWINGS

Figure 1:
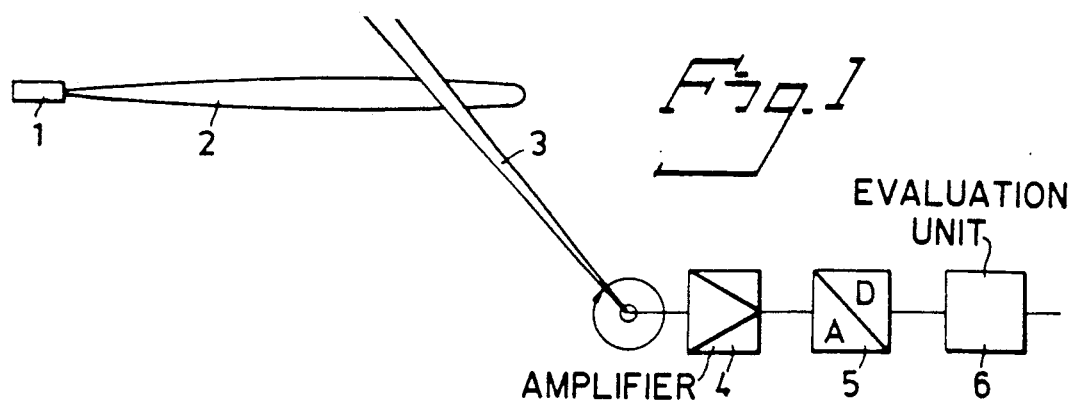

In FIG. 1 a laser beam source has been designated by 1. The laser beam source 1 can consist, for example, of a Nd YAG-laser which emits pulsed laser radiation with a pulse length of the order of magnitude of 15 ns and a pulse spacing of the order of magnitude of 0.1s. The transmitter lobe of the laser beam source is designated by 2. A receiver lobe 3 rotating preferably in the horizontal plane scans the air space. The receiver lobe 3 can advantageously have a horizontal lobe breadth of the order of magnitude of 10° and a vertical lobe breadth of between 60° and 80°. The field strength of the transmitter lobe is made up of scattered light and direct light. The detected scattered light varies with the direction of rotation of the sensitivity lobe and shows an insignificant quantity of speckles, in contrast to the direct beam which shows a number of speckles upon thermal atmospheric turbulence. In the invention it is the scattered light which is primarily of interest for the directional determination. When the receiver lobe is rotated for scanning the air space and the receiver lobe scans part of the transmitter lobe 2, the receiver lobe can detect any amplitude peaks occurring in the transmitter lobe as scattered light.

Figure 2:
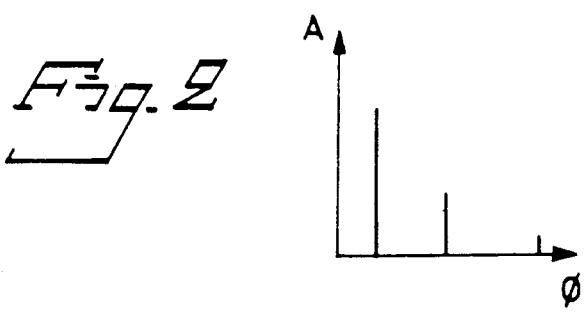

FIG. 2 shows examples of amplitude peaks A which can be obtained during rotation of the receiver lobe about one turn in the horizontal plane as a function of the angle of rotation of the receiver lobe. The direction to the laser beam source is established on the basis of the greatest amplitude peak. Since the laser beam source does not transmit continuously, the direction corresponding to the greatest amplitude peak is not necessarily the exact direction to the laser beam source. It is possible that a greater amplitude peak could have been detected if the time relations between the laser pulses of the laser beam source and the rotation of the receiver lobe had been different. On average, the greatest amplitude peak is situated half way between two adjacent amplitude peaks from the correct direction to the laser beam source. The angle of rotation corresponding to the greatest amplitude peak is therefore corrected by an angle value corresponding to half the distance between two amplitude peaks in order to obtain a probably more correct determination of direction to the laser beam source.

The detected amplitude peaks are amplified in an amplifier 4 and are advantageously converted to a digital signal in an analog-to-digital convertor 5. The digital signal is evaluated in an evaluation unit 6 which determines the greatest amplitude peak during a rotational turn of the receiver lobe and corrects the angle of rotation corresponding to the greatest amplitude peak by an angle value corresponding to half the distance between two amplitude peaks.

Figure 3:
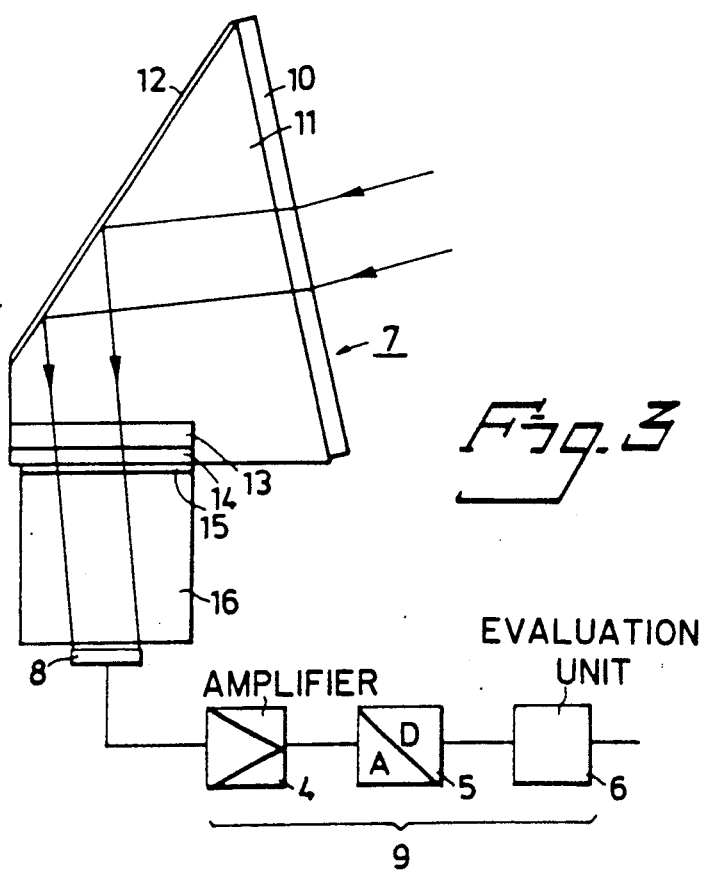

A system for determining the direction to the laser beam source is shown in FIG. 3 in a first preferred embodiment. The system includes a rotatable optics system 7, a fixed detector 8 and an evaluation part 9. The optics system is made up of a cylindrical lens 10 which receives incident light, which can originate from a laser beam source, and whose cylinder axis lies essentially in the plane of the drawing. The main purpose of the cylindrical lens 10 is to form the receiver lobe of the rotating optics system, with a lobe breadth in the horizontal plane of for example 10°. The cylindrical lens 10 is arranged on the input surface of a prism 11. A reflector 12 is arranged on a second surface of the prism 11, and on a third surface, the output surface of the prism, there is a filter 13. A laser beam incident on the input surface of the prism passes through the prism 11 and is reflected on the reflector 12 in order to then leave the prism 11 through the output surface. The filter 13 limits the wavelength range to be considered and preferably has a transmission breadth of <50 nm for a wavelength range of incident laser light of the order of magnitude of 1 μm. When the laser light has passed the filter 13, the light goes through a second cylindrical lens 14, a diaphragm 15 and a glass block 16 so as to finally strike the fixed detector 8. The cylindrical lenses 10 and 14, which both have their cylinder axes essentially in the plane of the drawing, have light-collecting tasks. The diaphragm 15, together with the first cylindrical lens 10, essentially defines the form of the sensitivity lobe. The prism and glass block contribute to a favorable field of view in the vertical direction. The optics system described affords an even distribution of the received energy across the whole surface of the detector 8. The output signal from the detector 8 is coupled to an evaluation part 9 in which there is an amplifier 4, an analog-to-digital convertor 5 and an evaluation unit 6. The evaluation unit 6 determines the greatest amplitude peak for each rotational turn of the rotatable optics system and performs a correction of the angle of rotation value corresponding to the greatest amplitude peak by an angle value corresponding to half the distance between two adjoining amplitude peaks.

The light which is detected by the detector 8 can have a strength which varies very considerably. In order to be able to deal with such variations in strength, that is to say a large dynamics range, parts of the detector can be provided with damping arrangements so that the damped part of the detector contributes to the output signal of the detector when the incident radiation exceeds the saturation value for the non-damped detector part. In this context reference is made in particular to U.S. Pat. No. 3,193,687 and U.S. Pat. No. 3,962,577.

A second embodiment of the system for determining the direction to the laser beam source is shown in FIG. 4. The system includes a rotatable optics system 7, fixed detectors 8a and 8b, and an evaluation part 9. The rotatable optics system 7 is divided up into two separate parts a, b which are each made up of a cylindrical lens 10a/10b which receives incident light, which can originate from a laser beam source. The main task of the cylindrical lens 10a/10b is to form the receiver lobe of the rotatable optics system, with a lobe breadth in the horizontal plane of for example 10°. The cylindrical lens is arranged on the input surface of a prism 11a/11b with the cylinder axis essentially in the plane of the drawing. A reflector 12a/12b is arranged on a second surface of the prism 11a/11b, and on a third surface, the output surface of the prism, there is a filter 13a/13b. The two separate parts a, b are separated by a block 17. A light beam incident on the input surface of the prism passes through the prism 11a/11b and is reflected on the reflector 12a/12b in order to then leave the prism 11a/11b through the output surface. The filter 13a/13b limits the wavelength range to be considered and preferably has a transmission breadth of <50 nm for a wavelength range of incident laser light of the order of magnitude of 1 μm. When the laser light has passed the filter 13a/13b, the light passes through a second cylindrical lens 14a/14b, a diaphragm 15a/15b and a glass block 16a/16b so as to finally strike the fixed detector 8a/8b. The cylindrical lenses 10a/10b and 14a/14b have light-collecting tasks, and their cylinder axes are essentially in the plane of the drawing. The diaphragm 15a/15b, together with the first cylindrical lens 10a/10b, essentially defines the form of the sensitivity lobe. The prism and glass block contribute to a favourable field of view in the vertical direction. The optics system described affords an even distribution of the received energy across the whole surfaces of the detectors 8a, 8b. The output signal from the detectors 8a, 8b is coupled to an evaluation part 9 in which there is an amplifier 4, an analog-to-digital convertor 5 and an evaluation unit 6. The evaluation unit 6 determines the greatest amplitude peak for each turn scanned by the rotatable optics system and performs a correction of the angle of rotation value corresponding to the greatest amplitude peak by an angle value corresponding to half the distance between two adjoining amplitude peaks.

FIG. 5 shows a third exemplary embodiment of a system for determining the direction to the laser beam source. The system includes a rotatable optics system 7, a fixed detector 8 and an evaluation part 9. The optics system has two light inputs. From the light inputs the light is conveyed towards the fixed detector 8 a separate part for each light input consisting of a first cylindrical lens 10a/10b, a prism 11a/11b and a reflector 12a/12b, and a common part consisting of a filter 13, a second cylindrical lens 14, a diaphragm 15 and glass block 16. In contrast to the exemplary embodiment according to FIG. 4, the incoming light is detected here by a single detector. This means that the construction requires fewer components. In FIG. 5 the input surfaces have been shown turned 180° relative to each other in the plane of rotation, primarily for the purpose of clarification. In the case where a common detector is used and a rotatable optics system with partly common components, a 180° relative turning is normally not suitable, since it is not possible to determine on which light input the incoming light is incident. By changing the relative turning to a value different from 180°, for example 135°, this problem can be avoided.

In order to prevent reflection-susceptible objects situated in the vicinity of the direction-determining system from interfering with the system, it is possible to arrange around the direction-determining system a casing (not shown) with maskings which prevents reflections from the reflection-susceptible objects. An example of a reflection-susceptible object is the turret of a submarine.

I claim:

1. A method for determining the direction to a laser beam source emitting a pulsed laser beam, by detecting light having a pulsed character and occurring within the scattering area of the laser beam when the pulsed laser beam generated by the laser beam source passes through an air space, said method comprising the steps of:

detecting the direction-related amplitude peaks of the light pulses by at least one fixed detector with the aid of at least one rotating receiver lobe with a given limited lobe breadth in the plane of rotation of the lobe for each detector, wherein said amplitude peaks are being related to the direction of the receiver lobe relative to the laser beam source;

comprising detected direction-related amplitude peaks in an evaluation unit in order to determine the greatest amplitude peak; and determining the angle of rotation value of the associated receiver lobe, corresponding to the greatest detected amplitude peak by said evaluation unit which angle belongs to a limited angle range which is assumed to include the actual direction to the laser beam source.

2. A method according to claim 1, wherein an angle of rotation to the laser beam source is determined as the angle of rotation corresponding to the greatest amplitude peak corrected by an angle of rotation corresponding to half the distance between two detected adjoining amplitude peaks.

3. A system for determining the direction to a laser beam source emitting a pulsed laser beam, by detecting light occurring in the scattering area of the laser beam when the pulsed laser beam generated by the laser beam source passes through an air space, said light having a pulsed character, said system comprising:

a rotatable optics system with at least one light input including counting from each light input, a first cylindrical lens, a prism, a reflector, a filter, a second cylindrical lens, a diaphragm and a glass block, said optics system having receiver lobes with a predetermined limited lobe breadth in the plane of rotation of the system for the light inputs;

a fixed detector system for detecting amplitude peaks occurring within the receiver lobes; and an evaluation unit for determining, on the basis of the detected amplitude peaks and angle of rotation values corresponding to the amplitude peaks, the direction to the laser beam source as included into a limited angle range corresponding to the greatest detected amplitude.

4. A system according to claim 3, wherein the optics system is provided with two light inputs.

5. A system according to claim 4, wherein said filter, second cylindrical lens, diaphragm and glass block which are incorporated in the rotatable system are common to the two light inputs, and wherein the detector system consists of a single fixed detector.

6. A system according to claim 4, wherein the optics systems is made up of two separate parts which are designed to cooperate each with a light input, and wherein the detector system consists of a fixed detector for each one of the two separate parts.

7. A system according to claim 7, wherein the light inputs in the plane of rotation of the rotatable optics systems are turned 180° relative to each other.

* * * * *

UNITED STATES PATENT AND TRADEMARK OFFICE
CERTIFICATE OF CORRECTION

PATENT NO. : 5,040,892

DATED : August 20, 1991

INVENTOR(S) : Bengt Bjorkman

It is certified that error appears in the above-identified patent and that said Letters Patent is hereby corrected as shown below:

In column 6, line 4, change "comprising" to --comparing--.

Signed and Sealed this

Thirteenth Day of April, 1993

*Attest:*

STEPHEN G. KUNIN

*Attesting Officer*     *Acting Commissioner of Patents and Trademarks*